UNITED STATES PATENT OFFICE.

MICHAEL J. CALLAHAN, OF PITTSFIELD, MASSACHUSETTS, ASSIGNOR TO GENERAL ELECTRIC COMPANY, A CORPORATION OF NEW YORK.

RESINOUS COMPOSITION AND PROCESS OF MAKING THE SAME.

1,108,332.

Specification of Letters Patent. Patented Aug. 25, 1914.

No Drawing.

Application filed July 9, 1913. Serial No. 778,116.

*To all whom it may concern:*

Be it known that I, MICHAEL J. CALLAHAN, a citizen of the United States, residing at Pittsfield, county of Berkshire, State of Massachusetts, have invented certain new and useful Improvements in Resinous Compositions and the Process of Making the Same, of which the following is a specification.

This application is in part a continuation of my prior application, Serial No. 694,350, filed May 1, 1912.

The present invention relates to synthetic resinous, gummy or plastic compositions usually known as "condensation products" and suitable for various purposes in the arts such as electrical insulations, molded materials, varnishes, and the like.

Resinous materials for certain technical uses, particularly for electrical insulation, should be strong and possess some degree of flexibility and tenacity. Many synthetic resins are more or less brittle and are for this reason greatly handicapped for many industrial purposes.

My present invention comprises an exceedingly strong, tough and flexible resinous product made by the interaction of a polyhydric alcohol, such as glycerin and a mixture of a polybasic acid of the aromatic series or its anhydrid, for example, phthalic anhydrid, and a dibasic acid of the aliphatic series, particularly succinic acid.

In carrying out my invention a desired mixture of the acids is mixed with a molecular equivalent proportion of a polyhydric alcohol and a reaction is caused by heating. For example, about 118.4 parts by weight of phthalic anhydrid, which corresponds to four-fifths of a molecular part, about 141.5 parts by weight of succinic acid which corresponds to one and one fifth molecular parts, and about 184 parts by weight of 100% glycerin which corresponds to two molecular parts, are mixed in a suitable retort and heated. The exact molecular proportions need not be strictly adhered to, an excess of glycerin for example will be driven off during the latter part of the reaction. The reaction takes place in two stages; first, the formation of a fusible, soluble product, and secondly, the transformation of this product to an infusible, insoluble state. The completion of the first reaction can be ascertained by taking out a small sample and allowing it to cool. If the cooled product is viscous but not sticky, the reaction has gone far enough. At this stage the product is soluble in acetone, making a clear solution useful as a varnish. It is also soluble in colophony, and glycerin.

If desired, the second reaction may be caused to take place and the product rendered infusible and substantially insoluble in common solvents, such as acetone, by heating to a moderate temperature, say about 85° C. to 150° C. for a considerable length of time. The length of heating will vary with the temperature used and the composition of the material. I have found that in many cases heating to a temperature of 85° C. at atmospheric pressure for about fifteen hours is sufficient to accomplish the final reaction. By raising the temperature this length of time may be reduced. For example, a layer one-tenth of an inch in thickness will harden in ten hours at 150° C. When the final hardening temperature is too high, a rapid evolution of vapor results, causing the product to be filled with cavities. When overheating is avoided a very strong, homogeneous, transparent resin is produced which has a high insulating value and is relatively inert chemically. The infusible resin may be dissolved in about an equal part of glycerin.

The amounts of the two classes of polybasic acids may be varied to correspond with the properties desired in the finished resin. For example a greater amount of succinic acid may be used with a correspondingly smaller amount of phthalic anhydrid to make a softer and more flexible product.

Instead of using the particular compounds given as examples, their homologues may in some cases be used. For example, sebacic acid may be used in place of succinic acid.

Chemically the resinous products thus obtained may be mixtures of esters of glycerin, or the like, and the respective acids. However, the difficulty accompanying the investigation of resinous bodies is well known. It may be that a very complex molecular structure is involved. Both the fusible and infusible resin may be saponified with a dilute alkali such as sodium hydroxid to regenerate glycerine, or other polyhydric alcohol, and form the corresponding sodium salt of the organic acids used, for example, the phthalate and the succinate of sodium.

By impregating fibrous, or cellular material with the acetone solution of the material in its soluble stage, the material may be introduced into the interstices of a body and then rendered insoluble and infusible. If desired the fusible resin may be mixed with about 10 to 15% of naphthalene and the fused mixture used under pressure as an impregnating compound for electrical coils and the like as described in my copending application Serial No. 747,115, filed Feb. 8, 1913, the naphthalene being subsequently driven off, and the resin hardened by heating.

What I claim as new and desire to secure by Letters Patent of the United States, is,—

1. The herein described tough, flexible material, being a mixture of esters formed by the interaction of a polyhydric alcohol, a dibasic acid of the aliphatic series and a polybasic acid of the aromatic series, insoluble and infusible without decomposition, possessing high electrical insulating properties, and being saponifiable with dilute alkali to regenerate the polyhydric alcohol and form a corresponding alkali salt of the acids employed.

2. As a composition of matter, a tough, flexible resinous material, being a mixture of glyceryl esters formed by the interaction of glycerin, succinic acid and phthalic anhydrid, infusible without decomposition, insoluble in common organic solvents, being saponifiable with dilute alkali to regenerate glycerin and form the succinate and the phthalate of the alkali.

3. As a composition of matter, a tough, flexible resin, being a mixture of glyceryl esters formed by the interaction of about 184 parts of glycerin, about 141 parts of succinic acid and about 118 parts of phthalic anhydrid by weight, having high insulating properties infusible without decomposition, substantially insoluble in common solvents, being saponifiable with dilute alkali to regenerate glycerin and form the succinate and the phthalate of the alkali.

In witness whereof, I have hereunto set my hand this 2nd day of July, 1913.

MICHAEL J. CALLAHAN.

Witnesses:
Tony Barone,
Julian S. Gravely.